US012697947B2

(12) United States Patent　　(10) Patent No.:　US 12,697,947 B2
Austermeier et al.　　　　　　　(45) Date of Patent:　　Aug. 4, 2026

(54) PEDAL EMULATOR FOR A VEHICLE, BRAKE PEDAL SYSTEM, METHOD OF ACTUATING A BRAKE PEDAL SYSTEM AND VEHICLE

(71) Applicant: HELLA GmbH & Co. KGaA, Lippstadt (DE)

(72) Inventors: Werner Austermeier, Schloss Holte-Stukenbrock (DE); Gilbert Grunow, Dortmund (DE); Ali Kemal Kuecuekyavuz, Erwitte (DE); Claus Viethen, Erwitte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/643,522

(22) Filed: Apr. 23, 2024

(65) Prior Publication Data

US 2024/0351562 A1　　Oct. 24, 2024

(30) Foreign Application Priority Data

Apr. 24, 2023　(DE) ..................... 10 2023 110 305.9

(51) Int. Cl.
　　*B60T 7/04*　　　　(2006.01)
(52) U.S. Cl.
　　CPC .................................... *B60T 7/042* (2013.01)
(58) Field of Classification Search
　　CPC ... G05G 5/03; B60T 7/042; B60T 7/06; B60T 2220/04; B60T 8/3255; B60T 8/409
　　See application file for complete search history.

(56) References Cited

U.S. PATENT DOCUMENTS 10,220,703 B2 *　3/2019　Viethen ................ B60K 26/021
11,169,559 B2 *　11/2021　Isono ........................ G05G 1/38
2021/0284169 A1　9/2021　Isono
(Continued)

FOREIGN PATENT DOCUMENTS

DE　　102014202872 A1　8/2015
DE　　102019101754 A1 *　7/2020　.............. B60T 7/042
(Continued)

OTHER PUBLICATIONS

Machine translation of DE 102020132845 A, obtained from fit database (Year: 2022).*

*Primary Examiner* — Thomas C Diaz
(74) *Attorney, Agent, or Firm* — Muncy, Geissler, Olds & Lowe, P.C.

(57)　　　　　　ABSTRACT

A pedal emulator for a vehicle that comprises a pedal lever that can be rotated about a first axis of rotation, a power generation unit that has a coupling element mechanically coupled to the pedal lever, and a reset carrier rotatable about a second axis of rotation. The power generation unit is set up to apply a counterforce to the pedal lever via the coupling element. A mechanical operative connection between the first axis of rotation and the second axis of rotation can be established via the coupling element. The coupling element is deformable when a driver exerts an actuating force on the pedal lever that is greater than the predefined maximum actuating force. The pedal emulator also has a first rotary sensor to detect a first rotation on the first axis of rotation and a second rotary sensor to detect a second rotation on the second axis of rotation.

15 Claims, 9 Drawing Sheets

(56) References Cited

U.S. PATENT DOCUMENTS

2024/0227748 A1* 7/2024 Austermeier ............. B60T 7/06
2024/0241536 A1* 7/2024 Austermeier ............. B60T 7/06

FOREIGN PATENT DOCUMENTS

DE    102020132845 A1 * 6/2022 ............... G05G 5/03
DE    102021124880 A1    3/2023
WO   WO-2016030068 A1 * 3/2016 ............. F02D 11/02

* cited by examiner

S1    S2    S3

PEDAL EMULATOR FOR A VEHICLE, BRAKE PEDAL SYSTEM, METHOD OF ACTUATING A BRAKE PEDAL SYSTEM AND VEHICLE

This nonprovisional application claims priority under 35 U.S.C. § 119(a) to German Patent Application No. 10 2023 110 305.9, which was filed in Germany on Apr. 24, 2023, and which is herein incorporated by reference.

BACKGROUND OF THE INVENTION

Field of the Invention

The present invention relates to a pedal emulator for a vehicle, a brake pedal system, a method of actuating such a brake pedal system, and a vehicle.

Description of the Background Art

Due to the increasing electrification of the vehicle market as well as increased exhaust gas requirements, it is necessary to think about new possibilities for generating braking effect. Current braking systems are already moving in the direction that the braking effect is no longer vacuum-based, but servo-electrically amplified. However, the braking effect is still purely mechanical.

The next development step is now aimed at completely decoupling the braking command from the driver and the braking effect (so-called "brake-by-wire"), as is already the case with the accelerator pedals. To ensure that the feel remains comparable to conventional braking systems, a mechanical simulation of the force-displacement curve is required. As compared to the accelerator pedal, there is a non-linear relationship between pedal stroke and pedal force. As a rule, it is a progressive increase in force over the pedal stroke.

In a simulation of the force-displacement curve, numerous mechanical components or elements can be provided. In the event of a malfunction of such mechanical components or elements, the transmission of the brake command by the driver can no longer be made or can only get worse. Transmission or translation of the brake command from the driver to generate the braking effect can no longer be guaranteed.

SUMMARY OF THE INVENTION

It is therefore an object of the present invention to provide a pedal emulator for a vehicle which, on the one hand, enables a good feel when actuating the pedal and, on the other hand, safe and reliable transmission of the brake command from the driver to generate a braking effect, especially in the event of a fault.

The above object is achieved by a pedal emulator, a brake pedal system, a method for actuating such a brake pedal system, and a vehicle according to the invention. Features and details described in connection with the pedal emulator according to the invention naturally also apply in connection with the brake pedal system according to the invention, the method according to the invention as well as the vehicle according to the invention and vice versa in each case, so that with regard to the disclosure to the individual aspects of the invention there always is or can be reciprocal reference.

According to a first aspect of the invention, the object is therefore achieved by a pedal emulator for a vehicle, comprising a pedal lever that can be rotated about a first axis of rotation, a power generation unit which has a coupling element that can be mechanically coupled to the pedal lever, and a reset carrier which is rotatable about a second axis of rotation. The power generation unit is set up to apply a counterforce to the pedal lever via the coupling element. A mechanical operative connection between the first axis of rotation and the second axis of rotation can be established via the coupling element. The coupling element can be deformed under an actuating force exerted by a driver on the pedal lever that is greater than a predefined maximum actuating force. The pedal emulator also has a first rotary sensor to detect a first rotation on the first axis of rotation and a second rotary sensor to detect a second rotation on the second axis of rotation.

In other words, a pedal emulator may be provided which has a coupling element which, in normal operation of the pedal emulator, can serve as a rigid mechanical operative connection between the pedal lever and the reset carrier, i.e., between the two axes of rotation, and which, in emergency operation of the pedal emulator, may deform in such a way as to interrupt the said mechanical operative connection.

Such a pedal emulator can be used to provide a mechanical safety mechanism, in particular for a vehicle brake system. It can happen that the pedal emulator is partially blocked, for example due to dirt, stones or other small parts. The mechanical safety mechanism provided by such a pedal emulator can enable emergency operation in the event of a blockage of the pedal emulator or pedal. Emergency operation, or the adoption of an emergency operation, may be achieved by providing a coupling element that deforms reversibly or irreversibly under a certain actuating force and/or under a certain pressure. If the driver's actuating force on the pedal lever is less than the predefined maximum actuating force, the coupling element can serve as a rigid mechanical operative connection. When the coupling element serves as a rigid mechanical operative connection between the first axis of rotation and the second axis of rotation, then the pedal emulator is considered to be in normal operation. Due to these manufacturable mechanical operative connections between the first axis of rotation and the second axis of rotation, i.e., between the pedal lever and the reset carrier, a first rotation on the first axis of rotation and a second rotation on the second axis of rotation can correlate and/or be synchronous with each other. The first rotation can preferably be a rotation of the pedal lever. The second rotation can preferably be a rotation of the reset carrier.

If the pedal emulator or pedal is blocked, the driver may be able to apply an increased actuating force or pressure force to the pedal lever. Such an increased actuating force usually exceeds a force threshold. When a force threshold is exceeded, the otherwise rigid coupling element can deform. The coupling element can have a safety element that can break when the force threshold is exceeded, so that the coupling element can only deform elastically when the safety element is broken. By deforming the coupling element, whether reversibly or irreversibly, a rotation on the first axis of rotation may also be possible. Due to the deformation of the coupling element, the mechanical operative connection between the two axes of rotation can be at least partially interrupted, so that the first rotation can take place independently of the second rotation. The blocked elements and/or components usually remain blocked, but an emergency operation of the pedal emulator, i.e., at least a first rotation on the first axis of rotation, can be adopted. The change from normal to emergency operation can be monitored or detected via the first rotary sensor and the second rotary sensor.

The force threshold can denote the predefined maximum actuating force. The predefined maximum actuating force can be predefined by elastic properties of the coupling element. The predefined maximum actuating force may depend on the material and/or geometrical properties of the coupling element. The coupling element can therefore be designed in such a way that a certain maximum actuating force can be predefined. The predefined maximum actuating force can depend, for example, on the diameter of a coupling rod of the coupling element, on the material or material combination of the coupling element, and/or on the geometry, such as a hollow geometry.

As a rule, the predefined maximum actuating force should be able to be applied by a person without much effort. The predefined maximum actuating force can be higher than the usual forces for operating a pedal or a brake pedal in normal operation. The predefined maximum actuating force can be between 3 and 20 N, especially between 5 and 10 N.

Since a first rotary sensor is located on the first axis of rotation, the pedal emulator can still be operated via the first rotation in such a way that it can be used to brake safely, even in the event of a blockage. In other words, in normal operation, redundancy can be provided by providing two rotary sensors. Emergency operation can be adopted by providing an interruptible active connection between the first axis of rotation and the second axis of rotation via the coupling element.

Deformation of the coupling element can be due to bending, breaking, and/or compression.

In particular, the pedal emulator can be a brake pedal emulator. In other words, the pedal emulator can be used in a brake pedal of a vehicle.

The power generation unit may have an intermediate lever that can be rotated about the first axis of rotation and is mechanically coupled to the coupling element. In this case, the reset element can be mechanically coupled to the intermediate lever, in particular supported by it. The coupling element can be arranged on the intermediate lever, especially molded on it, or attached to it as a separate part, such as a coupling rod.

Such a pedal emulator can advantageously provide a safe and reliable pedal emulator. At the same time, the feel of a conventional pedal (as described above with regard to a brake pedal) can be mimicked in an advantageous manner.

The coupling element can be set up in such a way that it is irreversibly deformable when the actuating force exerted by a driver on the pedal lever is greater than the predefined maximum actuating force. In particular, part of the coupling element may be irreversibly deformable if the predefined maximum actuating force is exceeded. For example, the coupling element may have a safety element that can irreversibly deform under predefined conditions, such as break.

The coupling element can be set up in such a way that it is reversibly deformable when a driver's actuating force exerted on the pedal lever is greater than the predefined maximum actuating force. In other words, once a blockage has been removed, the coupling element can again serve as a rigid coupling element to establish the mechanical operative connection between the first axis of rotation and the second axis of rotation. In particular, part of the coupling element may be reversibly deformable. Preferably, the coupling element can be designed in such a way that at least part of the coupling element bends, spreads and/or reduces in size when the predefined maximum actuating force is exceeded.

The power generation unit can be designed in such a way that a curve of the counterforce along a pedal stroke of the pedal lever is formed as a nonlinear curve in a pedal stroke counterforce diagram.

The non-linear curve of the counterforce generated by the power generation unit along the pedal stroke of the pedal lever or, in other words, along a rotation of the pedal stroke about the axis of rotation, which can be represented in the said pedal stroke counterforce diagram, mimics the feel of a conventional pedal (as described above in respect of a brake pedal).

In this case, the pedal stroke counterforce diagram can be formed by two different force paths that are connected to each other via the reset carrier. On the one hand, there is a pedal stroke counterforce travel between the pedal lever or the first axis of rotation and a reset element. On the other hand, there is a further pedal stroke counterforce travel between the pedal lever or the first axis of rotation and the reset carrier via the coupling element. Together, these two pedal stroke counterforce travels form the desired non-linear course of the counterforce along the pedal stroke. The reset element can be an element of the power generation unit, which on the one hand is mechanically coupled to the first axis of rotation and on the other hand is mechanically coupled to the coupling element via the reset carrier.

For example, a progressive curve can be provided as a non-linear curve. Accordingly, the counterforce increases disproportionately with increasing pedal stroke, i.e., with the increasing operation of the pedal lever by the driver.

The reset element can have two mechanical coupling points to the pedal lever. At one end of the reset element, this can be given by the mechanical coupling to the first axis of rotation. This can be done in such a way that the reset element is directly connected to the pedal lever. In another embodiment, which will be explained in more detail later, with an intermediate lever on the first axis of rotation, this can also be done by mechanically connecting the reset element to the intermediate lever. The mechanical coupling of the reset element to the first axis of rotation can therefore be carried out via a lever on the first axis of rotation, in particular the pedal lever or the intermediate lever.

The coupling element can be a coupling rod, in particular a breakable coupling rod. In other words, the coupling element can be designed, for example, as a coupling rod or as an extension of the intermediate lever mentioned above. In order to break such a coupling rod, a predefined breaking point or a predetermined breaking point can be provided. For example, the coupling rod can extend parallel or substantially parallel to the application axis of the actuating force.

The coupling element can be two-piece. For example, the coupling element can have a safety element. As a result, for example, a rigid mechanical operative connection between the first axis of rotation and the second axis of rotation can be provided in an advantageous manner until the predefined maximum actuating force is exceeded. For this purpose, it may be provided that the safety element breaks if the force threshold is exceeded.

The coupling element can have two parts that can interlock with each other. A predefined elasticity of the coupling element, e.g., for pre-defining the maximum actuating force, can thus be determined via a junction of the two parts. For example, the coupling element can have two Y-shaped parts, which can be attached to each other in a mirror-symmetrical manner, wherein the two Y-shaped parts can form a diamond.

As a result, the occurrence of an interruption of the mechanical operative connection between the first axis of rotation and the second axis of rotation can be defined more precisely. This can further improve the safety and reliability of the pedal emulator.

The coupling element can have a predetermined breaking point. As a result, the maximum actuating force can be better predefined, so that the interruption of the mechanical operative connection between the first axis of rotation and the second axis of rotation (which is desired in the event of a blockage) can be carried out more precisely via the coupling element.

The coupling element can have a main deformation axis that extends perpendicular or essentially perpendicular to an axis of the actuating force. In particular, this can be an elastically deformable coupling element. Alternatively or additionally, the main deformation axis can be oriented perpendicular or substantially perpendicular to a longitudinal extension of the coupling element. For example, the coupling element can have the shape of two mirror-symmetrically superimposed Ys. This means that the coupling element can have a diamond-shaped part, wherein a diagonal of the diamond-shaped part can correspond to the main deformation axis. As a result, for example, a safety element can be arranged in the diamond-shaped part.

This makes it easier to achieve a reversible deformation of the coupling element, for example.

According to a second aspect of the present invention, the object mentioned above is also achieved by a brake pedal system having a pedal emulator, as described above and below, and a control unit designed to detect a first rotation from the first rotary sensor on the first axis of rotation and a second rotation from the second rotary sensor on the second axis of rotation. The control unit is set up to detect a deformation of the coupling element based on an evaluation of the detected first rotation and the detected second rotation.

In other words, the control unit can detect or determine a change from normal operation to emergency operation. The control unit can therefore be set up to control the vehicle's brakes according to readings from the first rotary sensor or according to readings from the first and second rotary sensors. If a deformation of the coupling element is detected, it can be deduced that a blockage is taking place, because in the event of a blockage, the coupling element can be deformed in such a way that the mechanical, preferably rigid, active connection between the first axis of rotation and the second axis of rotation is interrupted. As a result, the first rotation no longer correlates with the second rotation, as is the case in normal operation, or at least no longer correlates as predefined. If, for example, a blockage occurs or the coupling element deforms due to an increased actuating force, the second rotary sensor can no longer provide a reliable measurement, which is why the brake should now only be controlled based on the measurement on the first axis of rotation.

The control unit can then control the brake via a suitable actuator according to the readings of the first rotary sensor (in emergency operation) or the first rotary sensor and the second rotary sensor (in normal operation) and thus according to the driver's wishes.

All the advantages explained in connection with the pedal emulator according to the first aspect of the present invention apply equally to the brake pedal system according to the second aspect of the present invention.

The brake pedal system can be a brake-by-wire brake system. It is conceivable that the brake pedal system also has a brake or that a brake of the vehicle is part of the brake pedal system.

According to an example of the brake pedal system, a deviation of a target correlation between the first rotation and the second rotation can be detected by evaluating the first and second rotations detected. In other words, a blockage, for example by the control unit, can be detected. If the coupling element serves as a rigid mechanical operative connection, the first rotation and the second rotation can correspond to a target correlation. A deviation of the target correlation can therefore be an indication of an error, a malfunction, a break of the coupling element, a deformation of the coupling element and/or a blockage. After the control unit detects the first rotation and the second rotation, an actual correlation can be derived. The control unit can therefore compare the actual correlation with the target correlation in order to detect a deviation. If no deviation is detected, i.e., usually also no deformation, the control unit can use both the first rotation and the second rotation or the corresponding readings to control the brake. In this case, the two rotary sensors provide redundancy. If a deviation or deformation is detected, the control unit can ignore the second rotation or the corresponding reading from the second rotary sensor and only control the brake based on the first rotation or the corresponding reading from the first rotary sensor.

The control unit can also be designed to control an electronic brake system of the vehicle based on the detected first rotation or on the detected first rotation and the detected second rotation, based on a detected deformation of the coupling element and/or on a deviation in the target correlation.

The control unit can also be set up to emit a warning signal based on a detected irreversible deformation of the coupling element and/or on a deviation in the target correlation.

The warning signal can be an audible signal or a haptic signal (e.g., through vibration) and/or a visual signal.

According to a third aspect of the present invention, the object mentioned above is achieved by a method of actuating a brake pedal system, as described above and below, having the following steps: a driver exerting an actuating force on the pedal lever; detecting a first rotation of the pedal lever on the first axis of rotation generated by the actuating force via the first rotary sensor and a second rotation of the reset carrier on the second axis of rotation generated by the actuating force via the coupling element via the second rotary sensor; evaluating the detected first rotation and the detected second rotation, wherein, if the actuating force exceeds a predefined maximum actuating force, the coupling element is deformed in such a way that the mechanical operative connection between the first axis of rotation and the second axis of rotation is interrupted, and wherein the deformation of the coupling element is detected based on the evaluation of the detected first rotation and the detected second rotation.

All the advantages which have been explained described in connection with the pedal emulator according to the first aspect and/or with the brake pedal system according to the second aspect apply equally to the method according to the third aspect.

According to an example of the method, the method also comprises the following step: controlling a brake of the vehicle based on the detected deformation of the coupling element and/or based on the first rotation detected or on the first rotation detected and the second rotation detected.

Finally, according to a fourth aspect of the invention, the object mentioned above is achieved by a vehicle having a brake pedal system as described above and below, or by a pedal emulator as described above and below.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
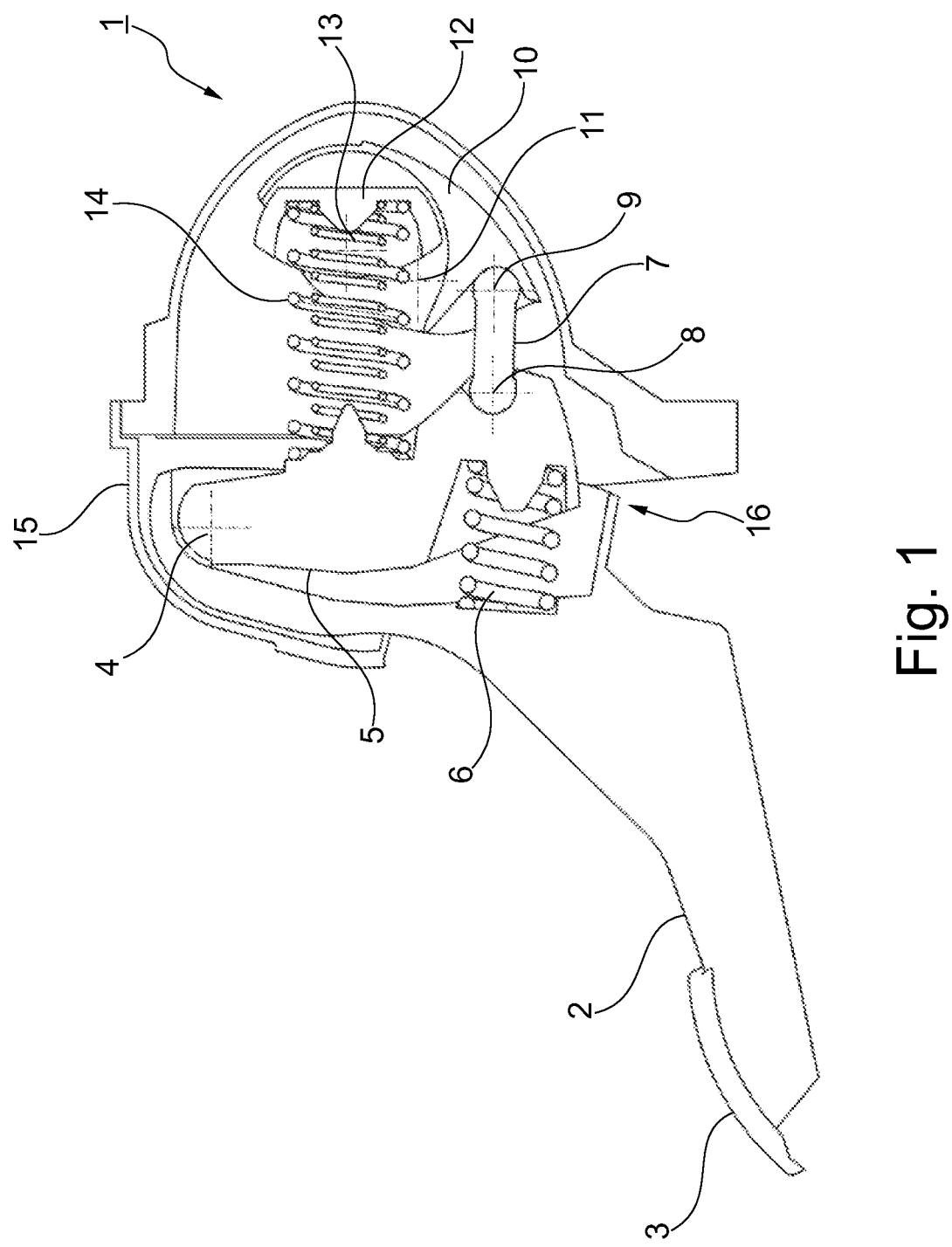
FIG. 1 is a cross-sectional view of a pedal emulator according to an example of the invention.

FIG. 1 shows a pedal emulator 1 for a vehicle 30 (see FIG. 9, there purely schematically), wherein the pedal emulator 1 is designed according to an example.

The pedal emulator 1 also has a power generation unit for exerting a counterforce on the pedal lever 1 via a coupling element 7 of the power generation unit mechanically coupled to the pedal lever 2. The pedal lever can be rotated about a first axis of rotation 4. In the present first embodiment, the coupling element 7 is designed as a coupling rod 7 with a first coupling element axis 8 and a second coupling element axis 9, but can alternatively also be formed differently, such as the embodiments explained later in relation to FIGS. 3, 6 and 7.

The counterforce generated acts in the opposite direction to the actuating force that the driver exerts on the pedal lever 2 or the actuating surface 3 during actuation. The power generation unit is designed in such a way that a curve of the counterforce along a pedal stroke of the pedal lever 2 is formed or shown as a progressive curve in a pedal stroke counterforce diagram.

In addition to the coupling element 7, the power generation unit in FIG. 1 has a reset element 14, which is designed as a return spring in the present example. On the one hand, the reset element 14 is mechanically coupled to the axis of rotation 4 and, on the other hand, it is mechanically coupled to the coupling element 7 via a reset carrier 10, in this case in the form of a spring carrier. The reset element 14 is mechanically coupled or supported by an intermediate lever 5, which can also be rotated about the first axis of rotation 4. Alternatively, the intermediate lever 5 can be omitted and the reset element 14 can be supported directly on the pedal lever 2, as shown in the exemplary embodiment of the pedal emulator in FIG. 6.

The reset carrier 10 is rotatably mounted about a second axis of rotation 11. The reset carrier axle 11 is suitably designed with a friction diameter and/or bearing force to provide a hysteresis when the pedal lever 2 is actuated.

A mechanical, preferably rigid, active connection can be established between the first axis of rotation 4 and the second axis of rotation 11 via the coupling element 7. When the driver exerts an actuating force on the pedal lever 2 that is greater than a predefined maximum actuating force or force threshold, the coupling element 7 is deformable. The coupling element 7 is preferably deformable when such a force threshold is exceeded, in such a way that the mechanical operative connection between the first axis of rotation 4 and the second axis of rotation 11 is at least partially interrupted or at least changes considerably.

On the first axis of rotation 4 there is a first rotary sensor, which can detect a first rotation about the first axis of rotation 4. A second rotary sensor is located on the second axis of rotation 11, which can detect a second rotation about the second axis of rotation 11.

FIG. 1 also shows that the reset element 14 has a seat 12 or spring seat, which is also rotatable and via which the reset element 14 is mechanically coupled to the reset carrier 10.

In addition, the pedal emulator 1 has a housing 15 in which the power generation unit and its components are located. The housing 15 has an opening 16 through which the pedal lever 2 extends and within which it can be freely rotated about the first axis of rotation 4.

Figure 2:
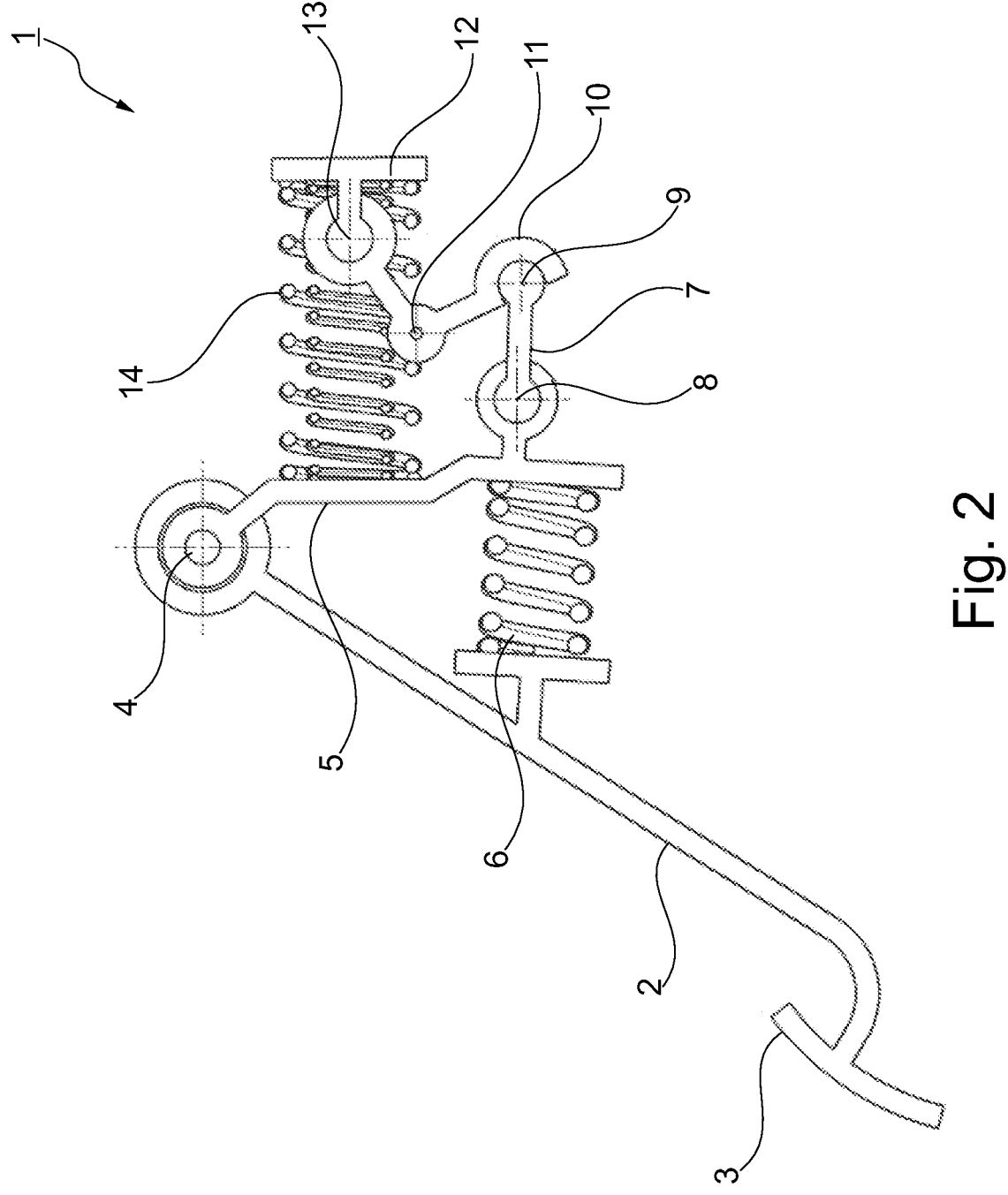
FIG. 2 is a schematic sketch of the pedal emulator in FIG. 1.

FIG. 2 shows a schematic sketch of the pedal emulator in FIG. 1. It is particularly easy to see that the reset carrier 10 and the coupling element 7 are mechanically connected to each other via its coupling element axis 9. As a result, the mechanical operative connection between the first axis of rotation 4 and the second axis of rotation 11 can be established. The coupling element 7 of the pedal emulator 1 of FIGS. 1 and 2 can be made of a material that can be compressed or bent at a predefined actuating pressure. If the actuating pressure falls below the predefined actuating pressure, the coupling element 7 can serve as a rigid mechanical operative connection. Alternatively, the coupling element 7 can be made of a material that does not allow bending or compression but breaks at a predefined actuating force or a predefined actuating pressure (see, for example, the coupling element 7 in FIG. 6).

In the exemplary embodiment in FIG. 2, the reset carrier 10 and the coupling element 7 or its coupling element axis 9 are designed to be form-fit to each other. For example, the reset carrier 10 may be formed with a socket and the coupling element 7 may be formed with a joint for this socket, as shown in FIG. 2.

Figure 7:
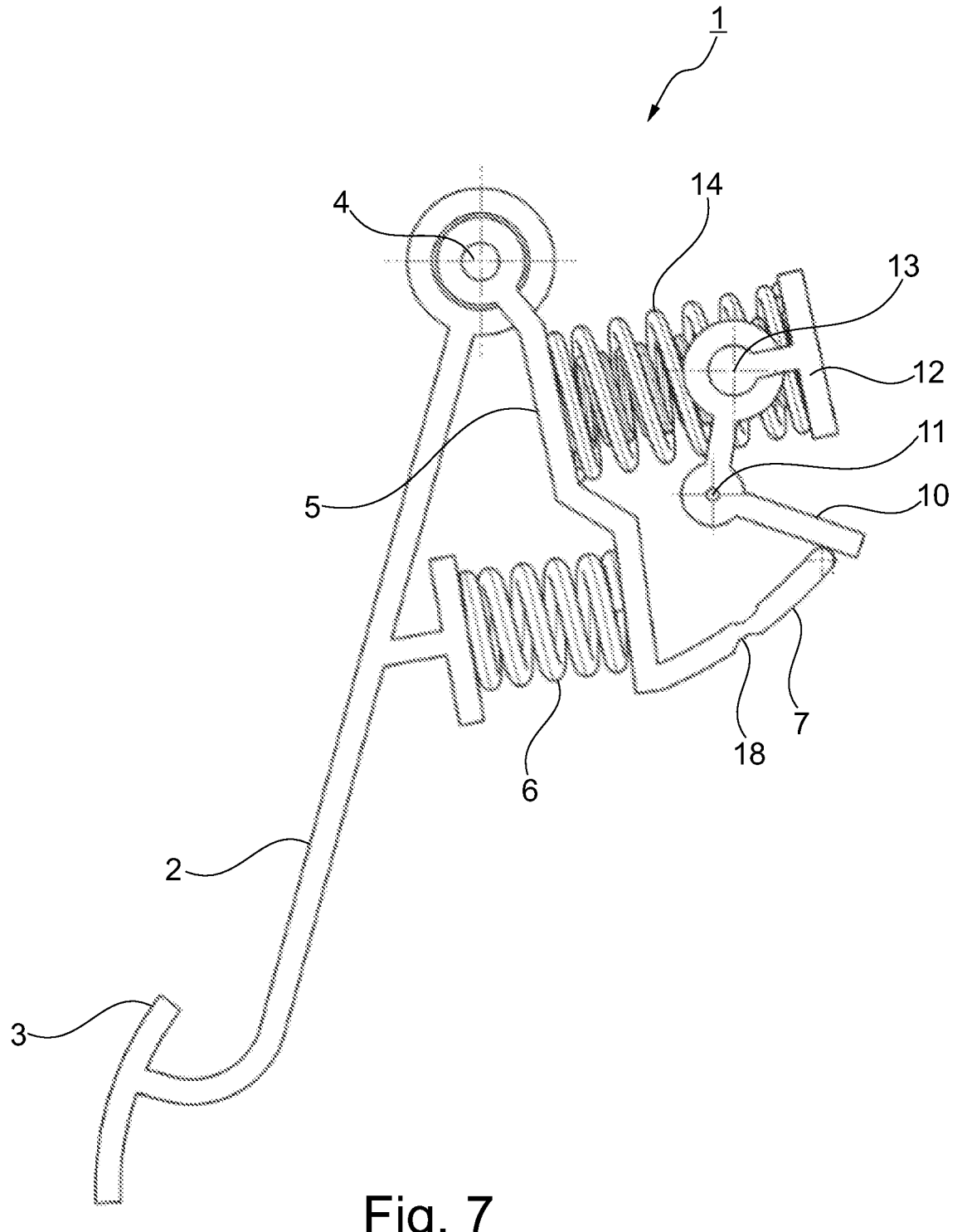
FIG. 7 is a schematic sketch of a pedal emulator according to an example of the invention.

Alternatively, however, it is also possible to design the reset carrier 10 and the coupling element 7 in a different way, for example in contact with each other, as shown in the exemplary embodiment of the pedal emulator 1 in FIG. 7.

Figure 3:
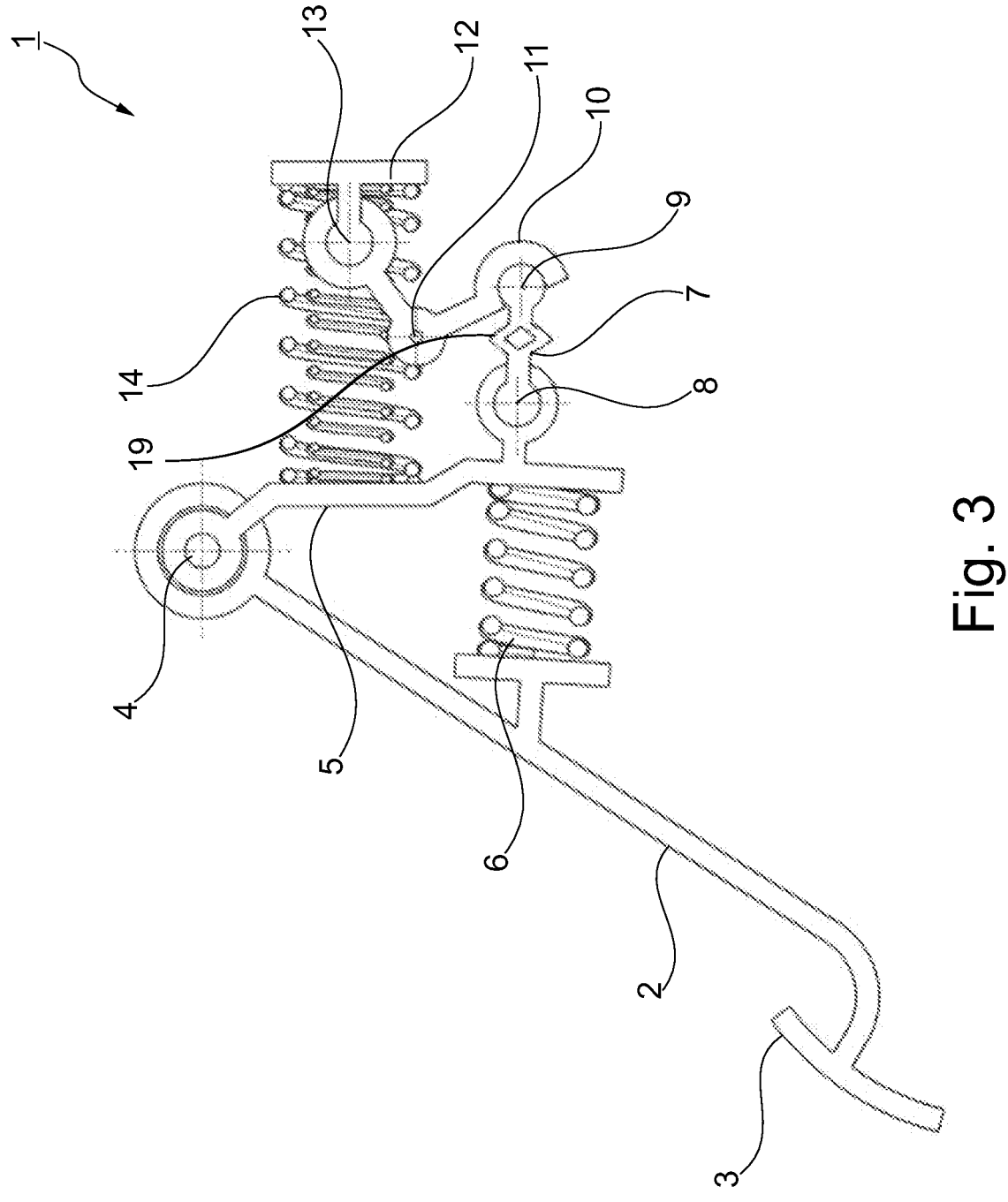
FIG. 3 is a schematic sketch of a pedal emulator according to an example.

FIG. 3 shows a schematic sketch of a pedal emulator according to an embodiment. Unless otherwise specified, the pedal emulator in FIG. 3 has the same elements and/or components as the pedal emulator in FIGS. 1 and 2. The coupling element 7 of the pedal emulator in FIG. 3 may have an elastic element 19. For example, the elastic element 19 can be a diamond-shaped part. In particular, the coupling element 7 can have a main deformation axis, which roughly corresponds to a diagonal of the diamond. The main axis of deformation of the coupling element 7 can be perpendicular or substantially perpendicular to an axis of actuating force. It is conceivable to provide a safety element inside, for example in an opening of the coupling element 7, of the pedal emulator 1. For example, the safety element may be designed in such a way that it can only deform irreversibly. In this case, the coupling element 7 can be formed in such a way that a deformation can also be reversed, i.e., reversible deformation occurs.

Figure 4:
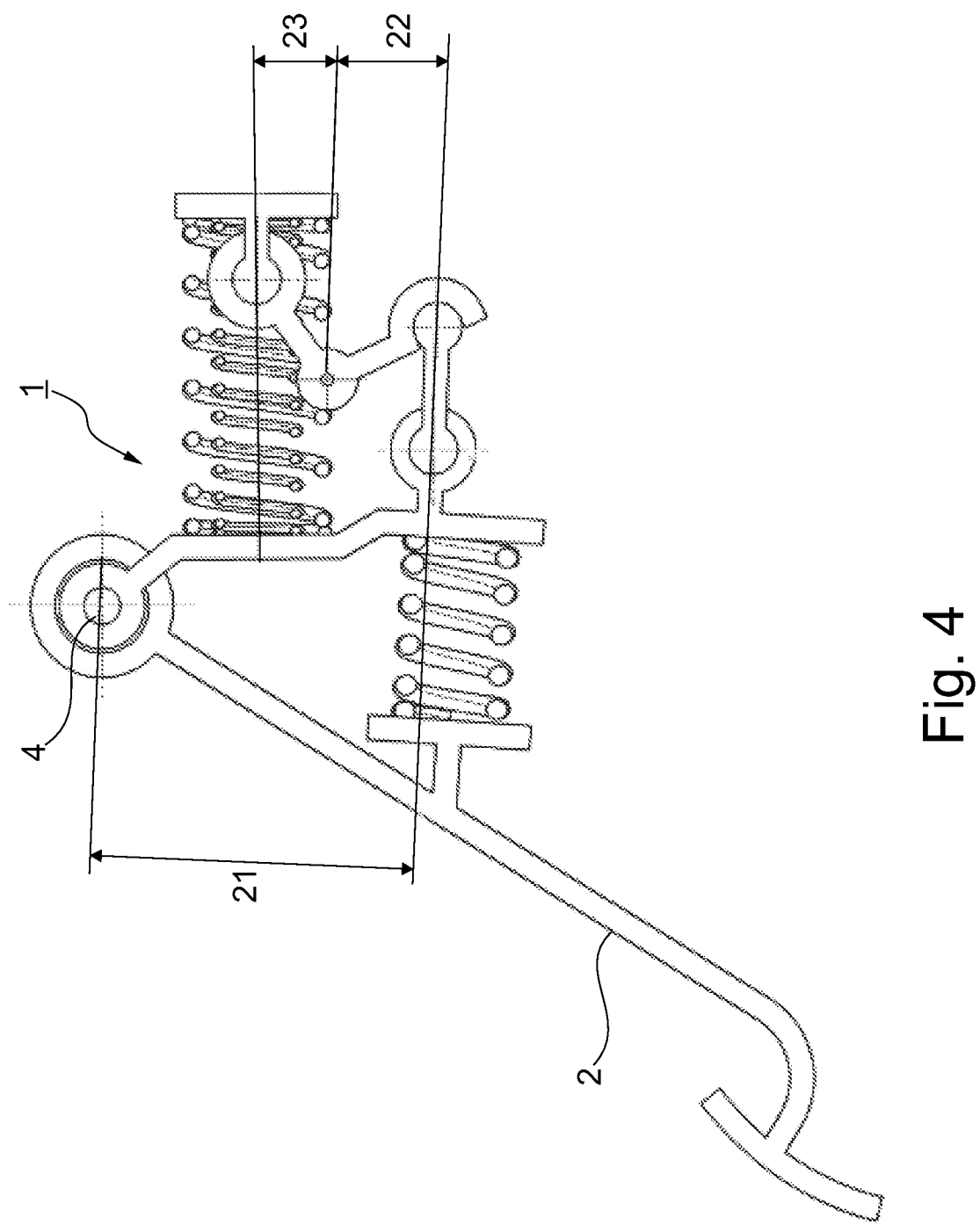
FIG. 4 shows the pedal emulator in FIG. 2 with the levers shown.
Figure 5:
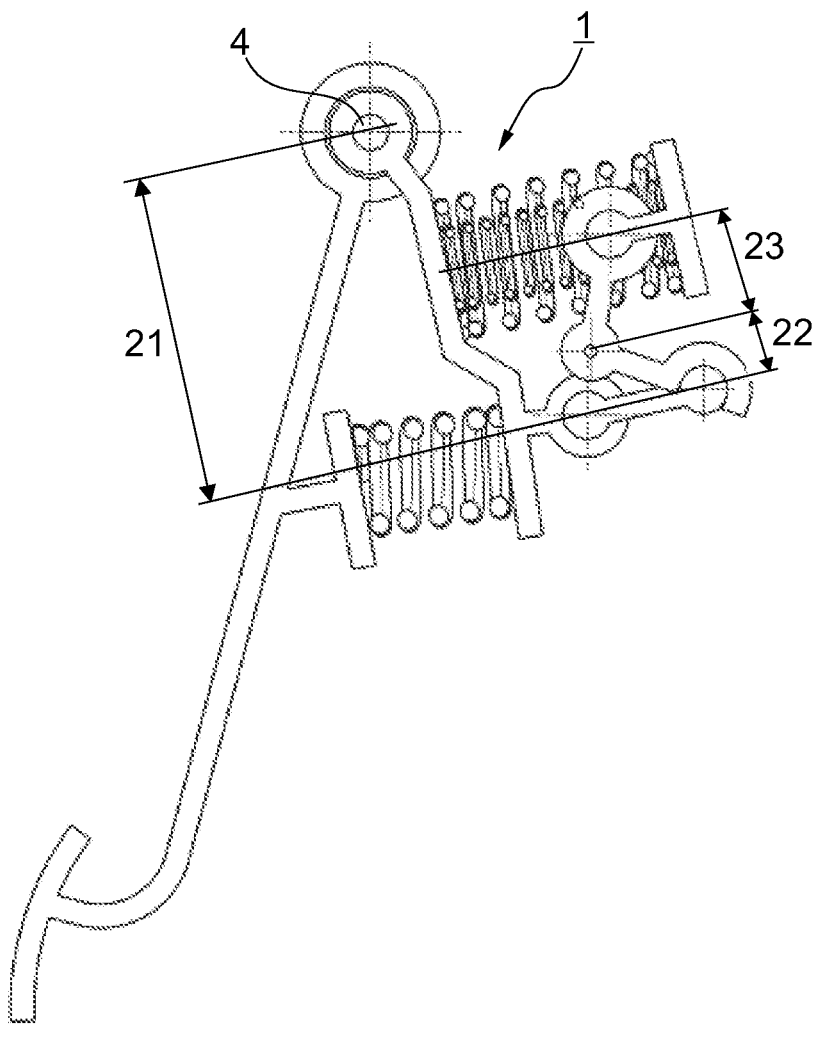
FIG. 5 shows the pedal emulator in FIG. 2 with the levers shown.

FIG. 4 shows the pedal emulator 1 with the levers 21, 22, 23 with the pedal lever 2 not actuated, while FIG. 5 shows the pedal emulator 1 with the pedal lever 2 actuated or depressed. In the present case, the actuating force exerted is such that the coupling element 7 serves as a mechanical, preferably rigid, active connection between the first axis of rotation 4 and the second axis of rotation 11. As can be seen in the comparison of FIGS. 4 and 5, the lever ratios of the levers 21, 22, 23 are set up in such a way that the transmission lever 22 becomes smaller as the pedal stroke increases, and the reset lever 23 becomes larger as the pedal stroke or the pedal lever 2 is actuated. Via the pedal stroke or the rotation of the pedal lever 2 about the axis of rotation 4, an increasingly progressive curve of the pedal stroke counterforce diagram can be provided.

Figure 6:
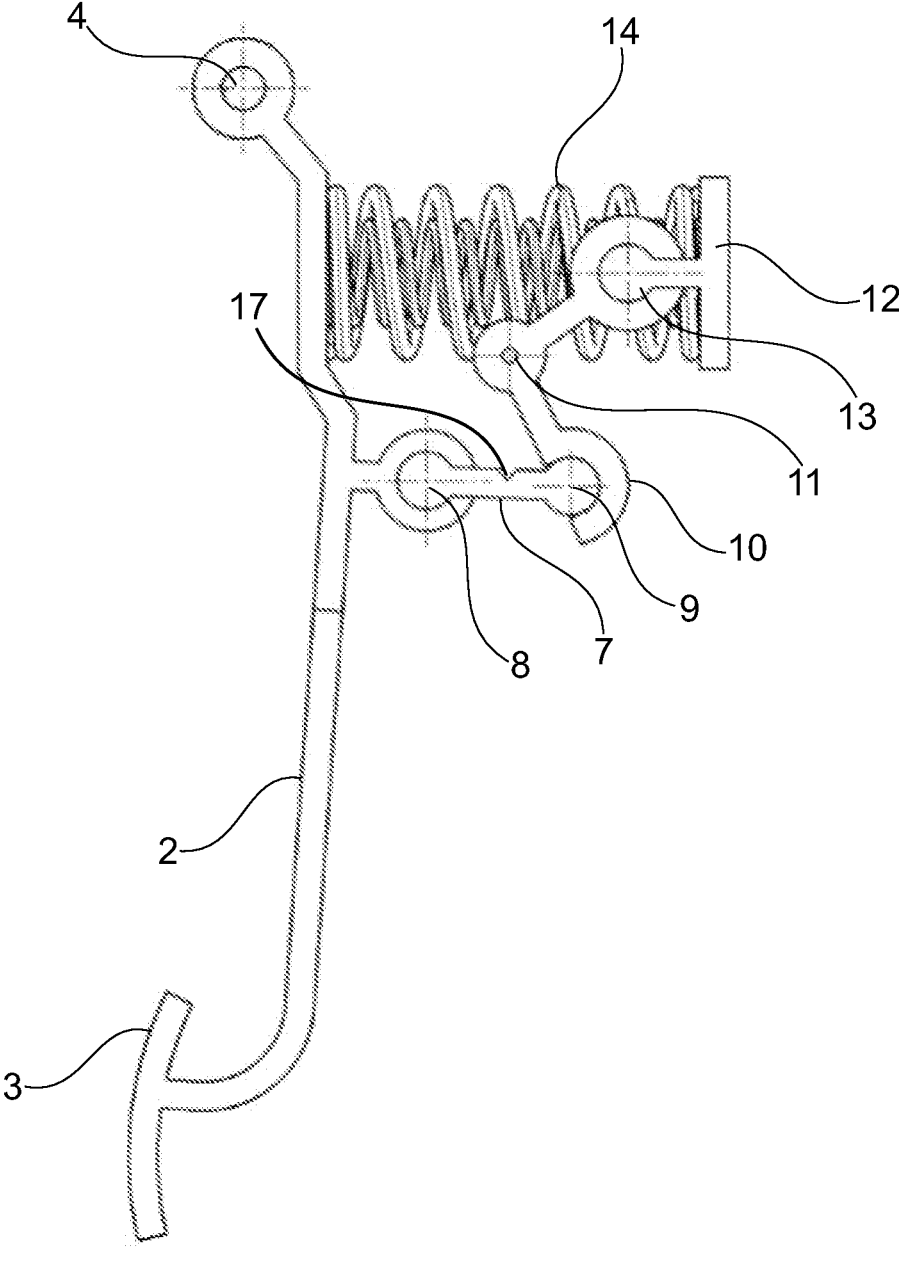
FIG. 6 is a schematic sketch of a pedal emulator according to an example of the invention.

FIG. 6 shows a schematic sketch of a pedal emulator 1 according to an embodiment of the invention. Unless otherwise specified, the pedal emulator in FIG. 6 has the same elements and/or components as the pedal emulator in FIGS. 1 to 5. It should be noted that the features of the different embodiments can be combined with each other in any way.

The coupling element 7 of the pedal emulator 1 of FIG. 6 has a predetermined breaking point 17. The predetermined breaking point 17 can be formed in such a way, such as the depth of the predetermined breaking point, that the coupling element 7 breaks at the point of the predetermined breaking point 17 when the predefined maximum actuating force is exceeded. The predefined maximum actuating force can therefore depend on the dimensions of the predetermined breaking point 17. The coupling element 7 in FIG. 6 may nevertheless be provided in combination with an intermediate lever 5 (cf. FIGS. 1 and 2).

FIG. 7 shows a schematic sketch of a pedal emulator 1 according to an embodiment of the invention. The coupling element 7 of the pedal emulator 1 in FIG. 7 is designed in one piece with the intermediate lever 5. In order to be able to deform elastically or irreversibly when the predefined maximum actuating force is exceeded, it can be provided that the coupling element 7 has a taper 18. This makes it possible, for example, to achieve a defined bending of the coupling element 7 when a force threshold is exceeded. Such a taper may be provided independently of the attachment of the coupling element 7 to the power generation unit.

Figure 8:
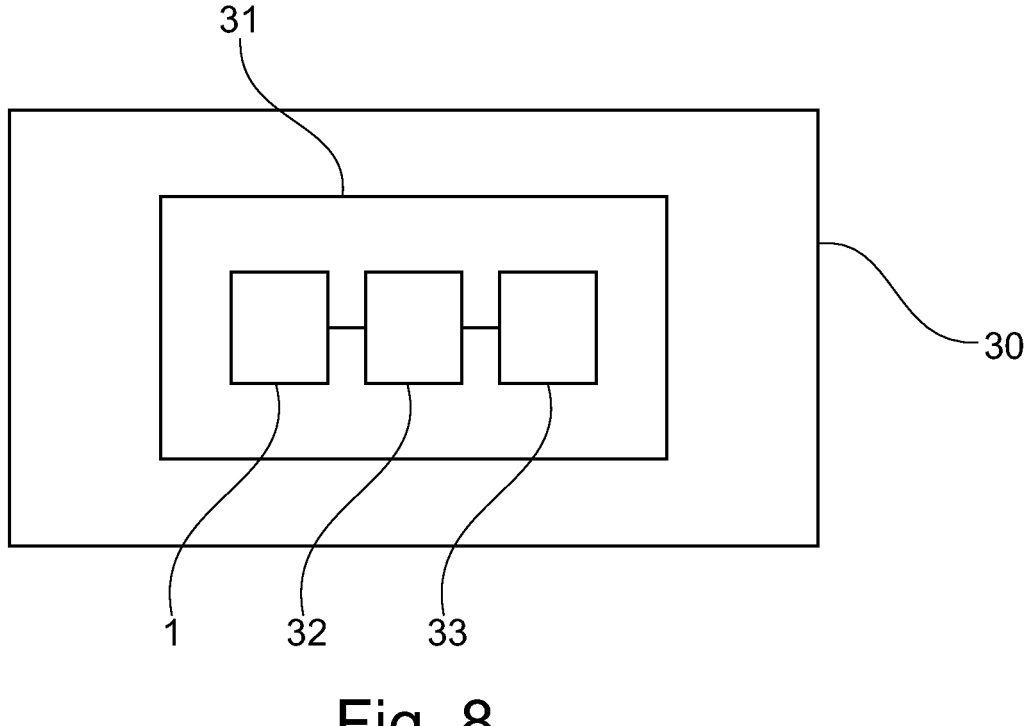
FIG. 8 is a schematic view of a vehicle with a brake pedal system.

FIG. 8 shows a purely schematic view of a vehicle 30, for example a car such as a passenger car. The vehicle 30 comprises a brake pedal system 31, such as a brake-by-wire braking system, with a pedal emulator 1 according to any one of the embodiments described above, and a control unit 32. In addition, a vehicle 30 brake 33 can be part of the brake pedal system 31. The control unit is connected to the first rotary sensor and the second rotary sensor of the pedal emulator 1 via data communication. The first rotary sensor is set up to determine the rotation or revolution of the pedal lever 2 about the axis of rotation 4. The second rotary sensor is set up to determine the rotation or revolution of the reset carrier 10 about the second axis of rotation 11. The control unit 32 controls the brake 33 according to the readings of the first rotary sensor and the second rotary sensor.

Figure 9:
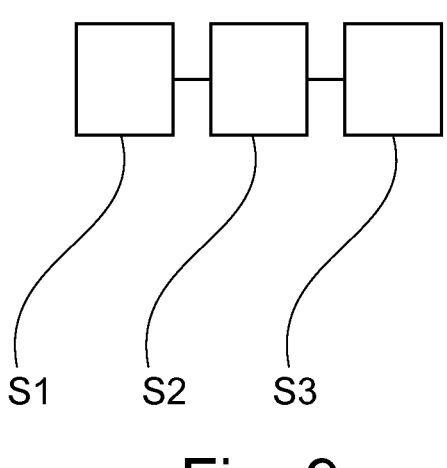
FIG. 9 is a flowchart of a method according to an example of the invention.

FIG. 9 shows a flowchart of a method for actuating a brake pedal system as the one described above, approximately as the one shown schematically in FIG. 8, according to an embodiment of the invention. In a first method step S1, a driver exerts an actuating force on the pedal lever, in particular via an actuating surface 3 (see FIG. 1). This creates a rotation on the first axis of rotation 4, which is detected by a first rotary sensor in a second method step S2. As a result, a second rotation of the reset carrier 10 about the second axis of rotation 11 is also generated, especially via the coupling element 7, which is also detected by a second rotary sensor in the second method step S2. In a third method step, S3, the detected first rotation and the detected second rotation are evaluated, in particular by a control unit of the brake pedal system 31. If the actuating force exceeds a predefined maximum actuating force, the coupling element 7 is deformed. In particular, the coupling element 7 is deformed in such a way that the mechanical operative connection between the first axis of rotation 4 and the second axis of rotation 11 is at least partially interrupted. The deformation of coupling element 7, be it a bend, a break or a compression, for example, is based on the evaluation of the detected first rotation and the detected second rotation.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A pedal emulator for a vehicle, the pedal emulator comprising:
   a pedal lever that is rotatable about a first axis of rotation;
   a power generation unit having a coupling element mechanically connectable with the pedal lever via an intermediate lever, the power generation unit being set up to apply a counterforce to the pedal lever via the coupling element;
   a reset carrier mounted rotatably about a second axis of rotation;
   a first rotary sensor to detect a first rotation on the first axis of rotation; and
   a second rotary sensor to detect a second rotation on the second axis of rotation,
   wherein a mechanical operative connection between the first axis of rotation and the second axis of rotation is established via the coupling element,
   wherein the coupling element is deformable under an actuating force exerted by a driver on the pedal lever that is greater than a predefined maximum actuating force, and
   wherein the intermediate lever is rotatable about the first axis of rotation.

2. The pedal emulator according to claim 1, wherein the coupling element is irreversibly deformable under the actuating force exerted by the driver on the pedal lever, which is greater than the predefined maximum actuating force.

3. The pedal emulator according to claim 1, wherein the coupling element is reversibly deformable under the actuating force by the driver on the pedal lever, which is greater than the predefined maximum actuating force.

4. The pedal emulator according to claim 1, wherein the coupling element is mechanically connected to the pedal lever, such that a curve of the counterforce applied by the power generation unit along a pedal stroke of the pedal lever is non-linear.

5. The pedal emulator according to claim 1, wherein the coupling element is a coupling rod or a breakable coupling rod.

6. The pedal emulator according to claim 1, wherein the coupling element is formed in two parts.

7. The pedal emulator according to claim 1, wherein the coupling element has a predetermined breaking point and/or an elastic element.

8. The pedal emulator according to claim 1, wherein the coupling element has a main axis of deformation which extends perpendicular or essentially perpendicular to an axis of exertion of the actuating force.

9. A pedal brake system comprising:
a pedal emulator, the pedal emulator comprising:
  a pedal lever adapted to be rotated about a first axis of rotation;
  a power generation unit having a coupling element mechanically connectable with the pedal lever, the power generation unit being set up to apply a counterforce to the pedal lever via the coupling element;
  a reset carrier mounted rotatably about a second axis of rotation;
  a first rotary sensor to detect a first rotation on the first axis of rotation; and
  a second rotary sensor to detect a second rotation on the second axis of rotation, wherein a mechanical operative connection between the first axis of rotation and the second axis of rotation is established via the coupling element, and wherein the coupling element is deformable under an actuating force exerted by a driver on the pedal lever that is greater than a predefined maximum actuating force; and
a control unit to detect a first rotation of the first rotary sensor on the first axis of rotation and a second rotation of the second rotary sensor on the second axis of rotation, the control unit detecting a deformation of the coupling element based on an evaluation of the detected first rotation and the detected second rotation.

10. The pedal brake system according to claim 9, wherein the evaluation of the detected first rotation and the detected second rotation detects a deviation of a target correlation between the first rotation and the second rotation.

11. The pedal brake system according to claim 10, wherein, based on the detected deformation of the coupling element and/or on the deviation of the target correlation, the control unit is also set up to control a brake of the vehicle based on the detected first rotation or based on the detected first rotation and the detected second rotation.

12. The pedal brake system according to claim 10, wherein the control unit emits a warning signal based on a detected irreversible deformation of the coupling element and/or on the deviation of the target correlation.

13. A vehicle having a brake pedal system according to claim 9.

14. A method for actuating a brake pedal system according to any one of claims 9 to 12, comprising the following steps:
  exerting an actuating force by a driver on the pedal lever;
  detecting, via the first rotary sensor, a first rotation of the pedal lever on the first axis of rotation generated by the actuating force, and detecting, via the second rotary sensor, a second rotation of the reset carrier on the second axis of rotation generated by the actuating force via the coupling element,
  evaluating the detected first rotation and the detected second rotation,
  wherein, when the actuating force exceeds a predefined maximum actuating force, the coupling element is deformed so as to interrupt the mechanical operative connection between the first axis of rotation and the second axis of rotation, and
  wherein the deformation of the coupling element is detected based on the evaluation of the detected first rotation and the detected second rotation.

15. The method according to claim 14, further comprising: controlling a brake of the vehicle based on the detected deformation of the coupling element and/or based on the detected first rotation or on the detected first rotation and the detected second rotation.

* * * * *